(12) United States Patent
Novak et al.

(10) Patent No.: US 8,509,133 B2
(45) Date of Patent: Aug. 13, 2013

(54) WIRELESS SCHEDULING SYSTEMS AND METHODS

(75) Inventors: Robert Novak, Ottawa (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 394 days.

(21) Appl. No.: 12/831,099

(22) Filed: Jul. 6, 2010

(65) Prior Publication Data

US 2011/0096708 A1  Apr. 28, 2011

Related U.S. Application Data

(63) Continuation-in-part of application No. 12/589,546, filed on Jul. 6, 2009, now abandoned.

(60) Provisional application No. 61/223,099, filed on Jul. 6, 2009, provisional application No. 61/078,562, filed on Jul. 7, 2008.

(51) Int. Cl.
*G08C 17/00* (2006.01)
*H04J 3/22* (2006.01)

(52) U.S. Cl.
USPC .......................... 370/311; 370/232; 370/468

(58) Field of Classification Search
USPC ................. 370/229–232, 252, 311, 329, 400, 370/431, 468
See application file for complete search history.

(56) References Cited

U.S. PATENT DOCUMENTS

| 7,551,637 B2 * | 6/2009 | Damnjanovic et al. ....... 370/412 |
| 2003/0169746 A1 * | 9/2003 | Kitazawa et al. ........ 370/395.42 |
| 2005/0170782 A1 | 8/2005 | Rong et al. |
| 2007/0142067 A1 | 6/2007 | Cheng et al. |
| 2008/0009322 A1 * | 1/2008 | Kim ............................ 455/562.1 |
| 2008/0186862 A1 * | 8/2008 | Corbett et al. ................ 370/237 |
| 2010/0091724 A1 * | 4/2010 | Ishii et al. ..................... 370/329 |

FOREIGN PATENT DOCUMENTS

| EP | 2129139 A1 | 12/2009 |
| WO | 2005/071868 A1 | 8/2005 |

OTHER PUBLICATIONS

International Search Report and Written Opinion for PCT Patent Application No. PCT/CA2010/001001, date of completion of search: Oct. 4, 2010, 8 pages.
Office Action for related U.S. Appl. No. 12/589,546, which issued on Sep. 6, 2011, 9 pages.

* cited by examiner

*Primary Examiner* — Kerri Rose
(74) *Attorney, Agent, or Firm* — Meyertons, Hood, Kivlin, Kowert & Goetzel, P.C.

(57) ABSTRACT

Methods and devices are described herein for prioritizing a plurality of packets for potential transmission and in an iterative fashion: i) determining power requirements for control channel signalling associated with a highest priority packet not yet analyzed for resource assignment; and ii) assigning resources for said highest priority packet if sufficient power for control channel signalling is available and sufficient resources for said highest priority packet are available. A further method includes assigning a plurality of users to one of a plurality of signalling groups, wherein said plurality of users within said one of a plurality of groups use a first of a plurality of HARQ interlace offsets for their first respective HARQ transmissions.

12 Claims, 16 Drawing Sheets

WIRELESS SCHEDULING SYSTEMS AND METHODS

RELATED APPLICATIONS

This application is a continuation-in-part of the non-provisional application Ser. No. 12/589,546 Jul. 6, 2009 now abandoned resulting from conversion under 37 C.F.R. §1.53(c)(3) of U.S. provisional patent application No. 61/223,099 filed on Jul. 6, 2009, and which claims the benefit of U.S. provisional patent application No. 61/078,562 filed on Jul. 7, 2008.

FIELD OF THE INVENTION

The invention relates to wireless communication techniques.

BACKGROUND OF THE INVENTION

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network. The CDMA 2000 wireless access technology from 3GPP2 is also evolving. The evolution of CDMA 2000 is referred to as the Ultra Mobile Broadband (UMB) access technology, which supports significantly higher rates and reduced latencies.

Another type of wireless access technology is the WiMAX (Worldwide Interoperability for Microwave Access) technology. WiMAX is based on the IEEE (Institute of Electrical and Electronics Engineers) 802.16 Standard. The WiMAX wireless access technology is designed to provide wireless broadband access.

OFDM technology uses a channelized approach and divides a wireless communication channel into many sub-channels which can be used by multiple mobile terminals at the same time. These sub-channels and hence the mobile terminals can be subject to interference from adjacent cells because neighbouring base stations can use the same frequency blocks.

Wireless base stations typically utilize scheduling resource allocation schemes for coordinating downlink communications. Such schemes may involve power control functionality. Bitmaps may also be used in conjunction with such schemes to reduce signalling overhead associated therewith.

Draft IEEE 802.16 mSystem Description Document, IEEE 802.16m-08/003r1, dated Apr. 15, 2008, was intended to amend the IEEE 802.16 Wireless MAN-OFDMA specification to provide an advanced air interface for operation in licensed bands. The draft was intended to describe provisions that meet the cellular layer requirements of IMT-Advanced next generation mobile networks and provide continuing support for legacy Wireless MAN-OFDMA equipment. In addition, the purpose of the draft was to provide performance improvements necessary to support future advanced services and applications, such as those described by the ITU in Report ITU-R M.2072.

The proposal provided in the draft document however, leaves many things to be desired.

SUMMARY OF THE INVENTION

According to a first aspect of the invention there is provided a method comprising: prioritizing a plurality of packets for potential transmission; in an iterative fashion: determining power requirements for control channel signalling associated with a highest priority packet not yet analyzed for resource assignment; and assigning resources for said highest priority packet if sufficient power for control channel signalling is available and sufficient resources for said highest priority packet are available.

In some embodiments, assigning resources is further dependent on sufficient power for transmitting said packet.

In some embodiments, said determining power requirements comprises reducing said power requirements for said control channel signalling until said power requirements are less than or equal to the available power.

In some embodiments, reducing said power requirements is performed only for re-transmissions.

In some embodiments the method further comprises distributing to one or more of said plurality of packets excess power remaining after assigning resources.

In some embodiments the method further comprises reducing power assignments for one or more of said plurality of packets prior to transmission.

According to a second aspect of the invention there is provided a method comprising: assigning a plurality of users to one of a plurality of signalling groups; wherein said plurality of users within said one of a plurality of groups use a first of a plurality of HARQ interlace offsets for their first respective HARQ transmissions.

In some embodiments the method further comprises assigning a second plurality of users to another one of said plurality of signalling groups, the second plurality of users using a second interlace offset for their first respective HARQ transmissions.

In some embodiments, the plurality of signalling groups is equal to the number of interlace offsets.

According to a third aspect of the invention there is provided a transmitter configured to: prioritize a plurality of packets for potential transmission; in an iterative fashion: determine power requirements for control channel signalling associated with a highest priority packet not yet analyzed for resource assignment; and assign resources for said highest priority packet if sufficient power for control channel signalling is available and sufficient resources for said highest priority packet are available.

In some embodiments, assigning resources is further dependent on sufficient power for transmitting said packet being available.

In some embodiments, the transmitter is further configured to reduce said power requirements for said control channel signalling until said power requirements are less than or equal to the available power.

In some embodiments, reducing said power requirements is used for retransmissions only.

In some embodiments, the transmitter is further configured to distribute to one or more of said plurality of packets excess power remaining after resource assignments.

In some embodiments, the transmitter is further configured to reduce prior to transmission power assignments for one or more of said plurality of packets.

According to a fourth aspect of the invention there is provided a transmitter configured to: assign a plurality of users to one of a plurality of signalling groups; wherein said plurality of users within said one of a plurality of groups use a first of a plurality of HARQ interlace offsets for their first respective HARQ transmissions.

In some embodiments, the transmitter is further configured to assign a second plurality of users to another one of said plurality of signalling groups and the second plurality of users use a second interlace offset for their first respective HARQ transmissions.

In some embodiments, the plurality of signalling groups is equal to the number of interlace offsets.

According to a fifth aspect of the invention there is provided a computer-readable medium having stored thereon computer executable instructions, that when executed by a computer, cause the computer to implement a method comprising: prioritizing a plurality of packets for potential transmission; in an iterative fashion: determining power requirements for control channel signalling associated with a highest priority packet not yet analyzed for resource assignment; and assigning resources for said highest priority packet if sufficient power for control channel signalling is available and sufficient resources for said highest priority packet are available.

In some embodiments, assigning resources is further dependent on sufficient power for transmitting said packet.

In some embodiments, said determining power requirements comprises reducing said power requirements for said control channel signalling until said power requirements are less than or equal to the available power.

In some embodiments, reducing said power requirements is performed only for retransmissions.

In some embodiments the computer-readable medium further comprises: distributing to one or more of said plurality of packets excess power remaining after assigning resources.

In some embodiments the computer-readable medium further comprises: reducing power assignments for one or more of said plurality of packets prior to transmission.

According to a sixth aspect of the invention there is provided a computer-readable medium having stored thereon computer executable instructions, that when executed by a computer, cause the computer to implement a method comprising: assigning a plurality of users to one of a plurality of signalling groups; wherein said plurality of users within said one of a plurality of groups use a first of a plurality of HARQ interlace offsets for their first respective HARQ transmissions.

In some embodiments the computer-readable medium further comprises: assigning a second plurality of users to another one of said plurality of signalling groups, the second plurality of users using a second interlace offset for their first respective HARQ transmissions.

In some embodiments, the plurality of signalling groups is equal to the number of interlace offsets.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which.

DETAILED DESCRIPTION OF THE EMBODIMENTS OF THE INVENTION

Figure 1:
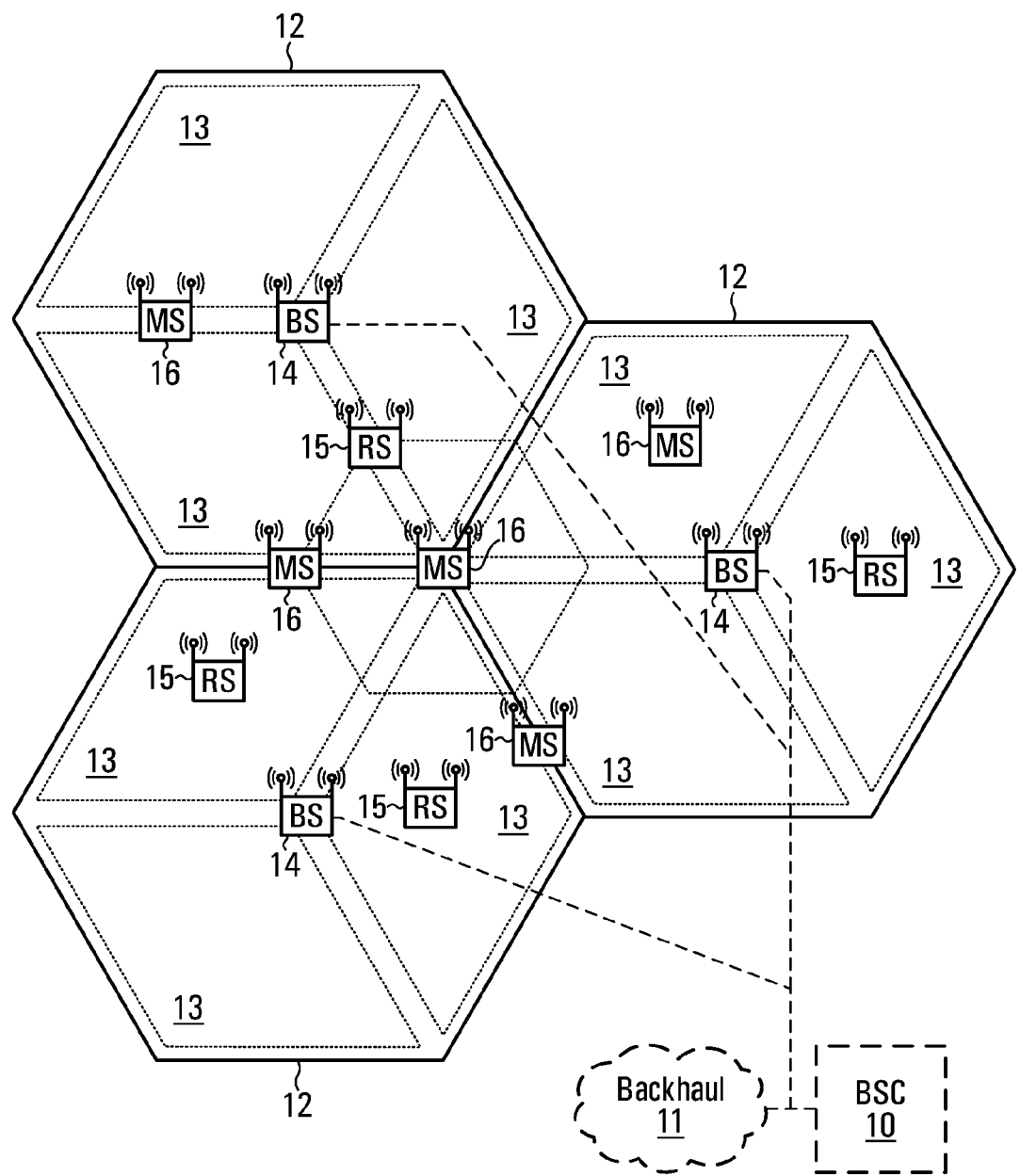
FIG. 1 is a block diagram of a cellular communication system on which embodiments of the invention may be implemented.

For the purpose of providing context for embodiments of the invention for use in a communication system, FIG. 1 shows a base station controller (BSC) 10 which controls wireless communications within multiple cells 12, which cells are served by corresponding base stations (BS) 14. In general, each base station 14 facilitates communications using OFDM with mobile and/or wireless terminals 16, which are within the cell 12 associated with the corresponding base station 14. The mobile terminals 16 may be referred to as users or UE in the description that follows. The individual cells may have multiple sectors (not shown). The movement of the mobile terminals 16 in relation to the base stations 14 results in significant fluctuation in channel conditions. As illustrated, the base stations 14 and mobile terminals 16 may include multiple antennas to provide spatial diversity for communications. In some configurations, relay station 15 may assist in communications between base station 14 and wireless terminals 16. Wireless terminals 16 can be handed off 18 from any cell 12, sector 13, zone (not shown), base station 14 or relay 15 to any other cell 12, sector 13, zone (not shown), base station 14 or relay 15. In some configurations, base stations 14 communicate with each other and with another network (such as a core network or the Internet, neither of which is shown) over a backhaul network 11. In some configurations, a base station controller 10 is not needed.

Methods of transmission described herein may be performed for one or both of uplink (UL) and downlink (DL). UL is transmitting in a direction from a mobile station to a base station. DL is transmitting in a direction from the base station to the mobile station.

Packet transmissions can be persistent assignments, or non-persistent assignments signalled within specific resource partitions. A persistent resource assignment is an assignment of a predefined, usually reoccurring, resource to a user, such that assignment to that user does not require further signaling for each reoccurrence. In some embodiments, persistent assignments are indicated to other users by a resource availability bitmap (RAB). In some embodiments a persistent resource assignment is used for first Hybrid Acknowledgement Request (HARQ) transmissions, and the assignment of the persistent resource may be known to a user, determinable by the user, or determinable by the user from a known set of MCSs being used for transmission. In some embodiments, HARQ re-transmissions, if needed, are allocated non-persistently by using resource/MCS adaptation. In some implementations, a resource map is used to indicate which resources are available or not currently being used for active persistent resource assignments.

In some embodiments of the invention, group allocation of resources is considered. Group allocation may be performed by signalling groups of users together using a bitmap or bitmaps.

In some embodiments algorithms described herein are specifically linked with the features of ultra mobile broadband (UMB) FL support for VoIP using Group Resource Allocation (GRA) bitmaps. Channel Quality Indicator (CQI) feedback and channel adaptation for VoIP, as they are pertinent to the scheduling and power control flow, are briefly discussed below.

In some implementations, adaptation to channel fading is based on CQI feedback. Frequency of the feedback determines an ability of a system to effectively adapt to each access terminal's (AT) changing channel conditions. Access terminal may include devices such as, but not limited to, cellular telephones, wirelessly enabled laptop computers, wirelessly enabled desktop computers tops, wirelessly enabled video game devices, tablet devices and wirelessly enabled MP3 players. The number of users expected in a 4G system with a system bandwidth of 5 MHz or more prohibits frequent feedback from each mobile due to congestion on the reverse link from the users to the base station. It is likely that feedback will be limited to intervals of approximately 20 ms, and further, given the very high loading of feedback channels due to the large number of VoIP users, the CQI estimates may have erasure rates as high as 50%.

When CQI reports are infrequent, some implementations may consider CQI averaging by a filter so as to prevent unstable scheduling based on unreliable CQI estimates. A relatively short CQI filter window may take advantage of the relatively small delay of the CQI feedback for first transmissions. This is the case if the CQI feedback is aligned with the first sub-packet of a HARQ transmission opportunity for each AT, as the estimate is not significantly out-of-date for the first HARQ transmissions. In a particular example, a data transmit power level based on the CQI estimate will be "out-of-date" for further re-transmissions, however only approximately 10% of packet transmission exceed two transmissions.

Adaptive modulation and coding and/or power control are techniques generally considered for channel adaptation. Adaptive modulation and coding can be used to adapt to the channel conditions as fed back by an AT, however, in a system such as VoIP where small, regular packets are the traffic, the benefit to changing the modulation coding scheme (MCS) is generally to minimize bandwidth resources used for each HARQ transmission. Signalling is required to inform the AT of the resources or MCS chosen for the HARQ transmission. In some implementations, Resource/MCS adaptation may involve MCS selection based on CQI and MCS selection thresholds. The selection thresholds may include variable margin levels for the thresholds and/or may be adjusted to achieve some metric, which may include, but are not limited to, a HARQ termination target, a packet error rate (PER), a residual PER, or a lowest delay.

An allocation size or packet format bitmap can be enabled in a Group Resource allocation (GRA) bitmap configuration for channel adaptation purposes. However, in most UMB VoIP proposals one resource segment is usually allocated per transmission so that there is little advantage in switching to higher order MCS's during favourable channel conditions, and additional signalling accompanying each transmission is undesirable as there can be many ATs receiving transmission every 20 ms.

As a resource size is generally fixed, and the signalling MCS to the AT for each transmission is seen as prohibitive, power control is used to achieve channel adaptation in some designs of VoIP for the UMB system described herein. Power control levels are fedback from the AT, and controlled by an outer loop power control is used to ensure a desired packet transmission statistic.

Hypothesis decoding is generally may distinguish the four MCS's corresponding to each Enhanced Variable Rate Codec (EVRC) vocoder rate. Packet formats used are indicated in the Group assignment message.

The following detailed description describes, with reference to the figures, various wireless scheduling schemes for use, though not limited to, in systems operating in accordance with 3GPP2 AIE standards.

Figure 2:
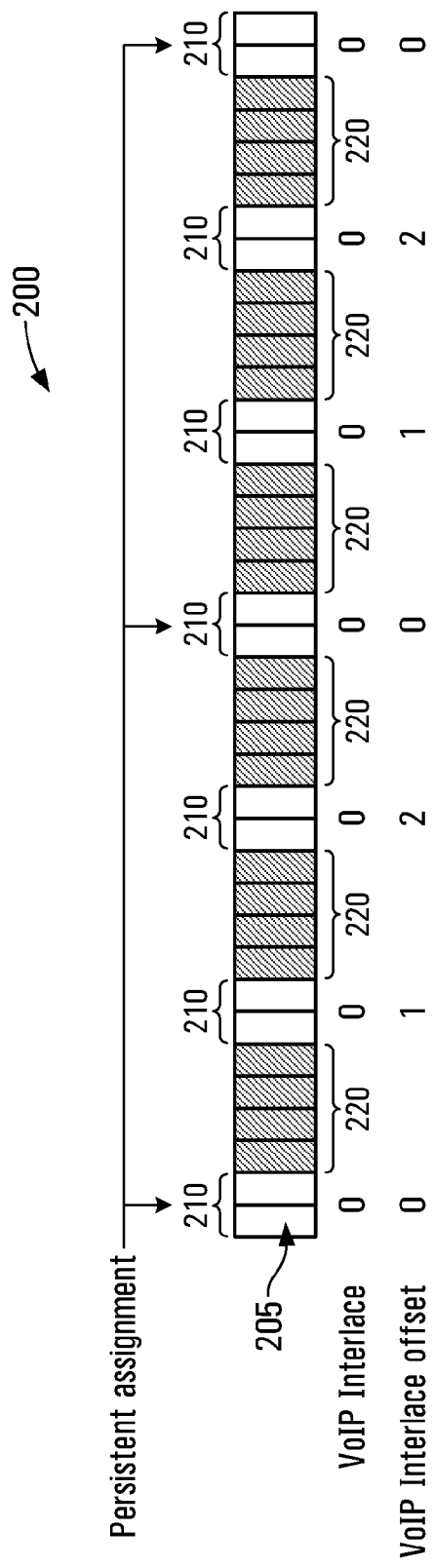
FIG. 2 is a schematic diagram of Voice over IP (VoIP) frame structure according to an aspect of the present invention.

FIG. 2 shows a portion of an example time-frequency resource VoIP frame structure 200. The frame structure consists of multiple frames indicated by the individual rectangular blocks 205. The frames may each include a plurality of time-frequency resource segments. Specifically, various time divisional multiplexing (TDM) slots 210,220 are shown. The TDM slots indicated by reference character 210 illustrate HARQ interlace. The TDM slot 210 forming the HARQ interlace in FIG. 2 includes two frames. The number of frames per interlace transmission period, which is two frame in FIG. 2, the number of frames between interlace transmission periods, which is four frames in FIG. 2, and the number of offsets, which is three in FIGS. 2 (0, 1 and 2), are merely for purposes of example. While FIG. 2 illustrates that the HARQ interlace is synchronous, this need not be the case in all implementations.

Figure 3:
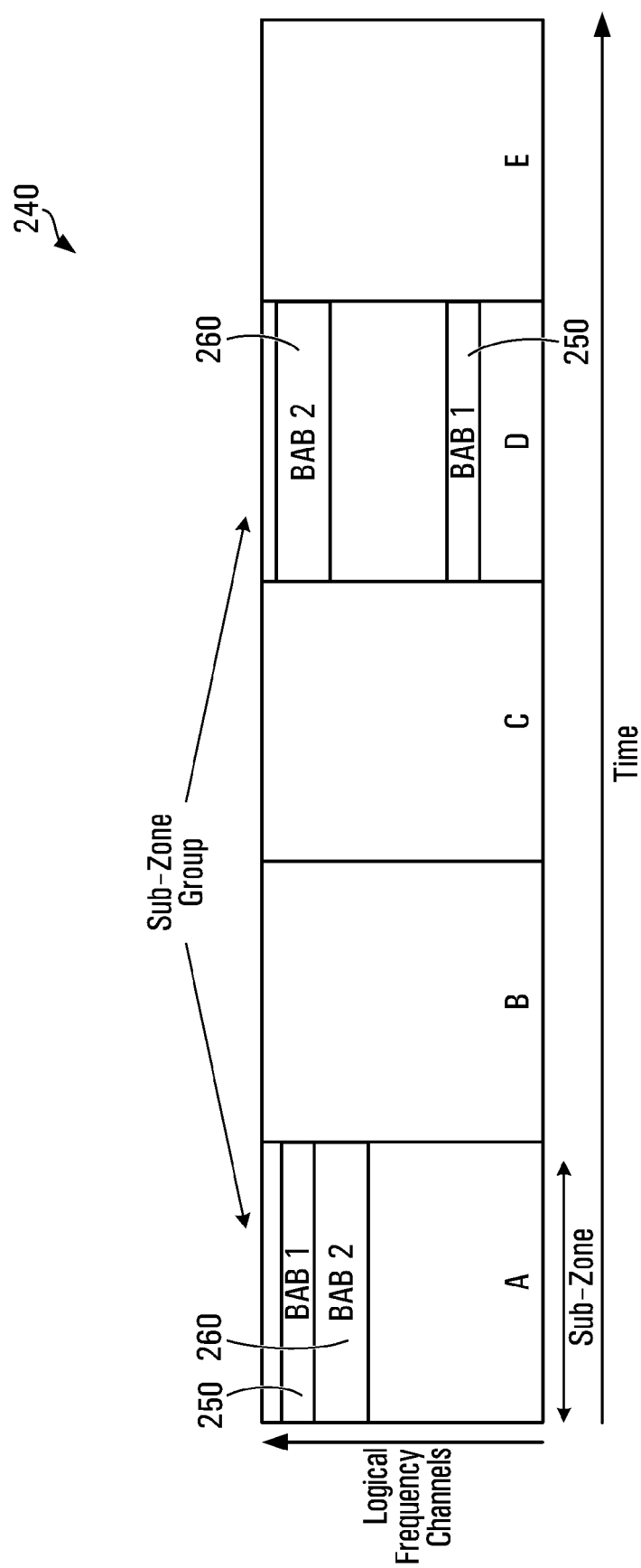
FIG. 3 is a schematic diagram that illustrates an example of a frame having subzones, in which one or more subzones having similar basic channel unit (BCU) allocations are grouped together according to an embodiment of the invention.

FIG. 3 illustrates a specific example of a frame 240, that may correspond to the structure of frame 205, having subzones A, B, C, D and E. Subzones A and D each have a first a basic channel unit (BCU) allocation block (BAB), BAB 1 250 and a second BAB 2 260. A BCU is a two dimensional time-frequency transmission resource, i.e. a given number of symbols over a given number of sub-carriers. The sub-carriers may be physical sub-carries or logical sub-carriers that are permuted based on a particular mapping of physical sub-carries to logical sub-carries. In some embodiments, within a subzone, a BAB has a same number of time-frequency resource blocks per OFDM symbol. In some embodiments, this may be true when averaged over one or more frames. While OFDM symbols are referred to specifically, it is to be understood that OFDM is considered for illustrative purposes, and other transmission formats are contemplated. Subzones A and D are grouped together as they both include BAB 1 250 and BAB 2 260. However, in the illustrated example, BAB 1 250 and BAB 2 260 occur over different resource blocks in subzones A and D. In a different sector, it is possible that subzone A would not be paired with subzone D.

In some embodiments, subzones can be grouped so that a similar BAB is present in one or more subzones that form the group. In some embodiments, diversity can occur by using sector-specific subzone groups. That is groups of subzones may be specific to a sector of a multi-sector telecommunications cell.

In some embodiments, transmission power is constrained over a group of subzones. Sector specific scrambling may increase the number of BABs from other sectors which a given BAB interferes with, thus averaging the interference from those BABs. In some implementations, using such scrambling of interferences results in a signal that has components from many different BABs, which can be advantageous to system performance.

An AT may be assigned a VoIP interlace, and a VoIP interlace offset for its first HARQ transmission opportunity on that interlace. As an example, if there are three VoIP interlaces and the number of VoIP interlace offsets is limited to three, the first HARQ packet transmission opportunities occur every 18 PHY frames. In some embodiments re-transmissions of a packet may continue within the same interlace.

In a case of persistently assigned first transmissions, an AT may be a persistently assigned resource on the VoIP interlace offset corresponding to its first HARQ transmission opportunity (e.g. interlace offset 0 in FIG. 2). Therefore, the AT does not need to decode the GRA bitmap for VoIP interlace offset 0. For the VoIP interlace offsets corresponding to the second and third HARQ transmission opportunities, for example, interlace offsets 1 and 2, the resource assigned to the AT is indicated in the GRA bitmap.

In some embodiments, signalling of VoIP resources that have been allocated is done via bitmaps. In some instances several users can be signalled as a group using a bitmap. For example, a position in the bitmap can be associated with a specific user, and by monitoring the bitmap the user can determine if data is being transmitted to it, and from the bitmap derive the location of the appropriate resource.

In orthogonal frequency division multiple access (OFDMA) systems, the signal bandwidth is typically divided into multiple channels and allocated to one or more users. During each scheduling interval, there may be a total power constraint and a total resource constraint. Scheduling and power control schemes may be used to allocate time-frequency and power resources to users and different packet transmissions. One reason is because unique services may have unique scheduling and power control requirements. For example, delay sensitive traffic such as VoIP traffic may require specially designed scheduling and power control methods. In a particular example an EVRC codec generates voice frame with four different rates or frame sizes: full rate, ½ rate, ¼ rate and ⅛ rate (which is blanked) with probabilities of 29%, 4%, 7% and 60% respectively. While a VoIP frame may have a fixed duration, for example 20 ms, packets may not arrive regularly due to network jitter.

Figure 5:
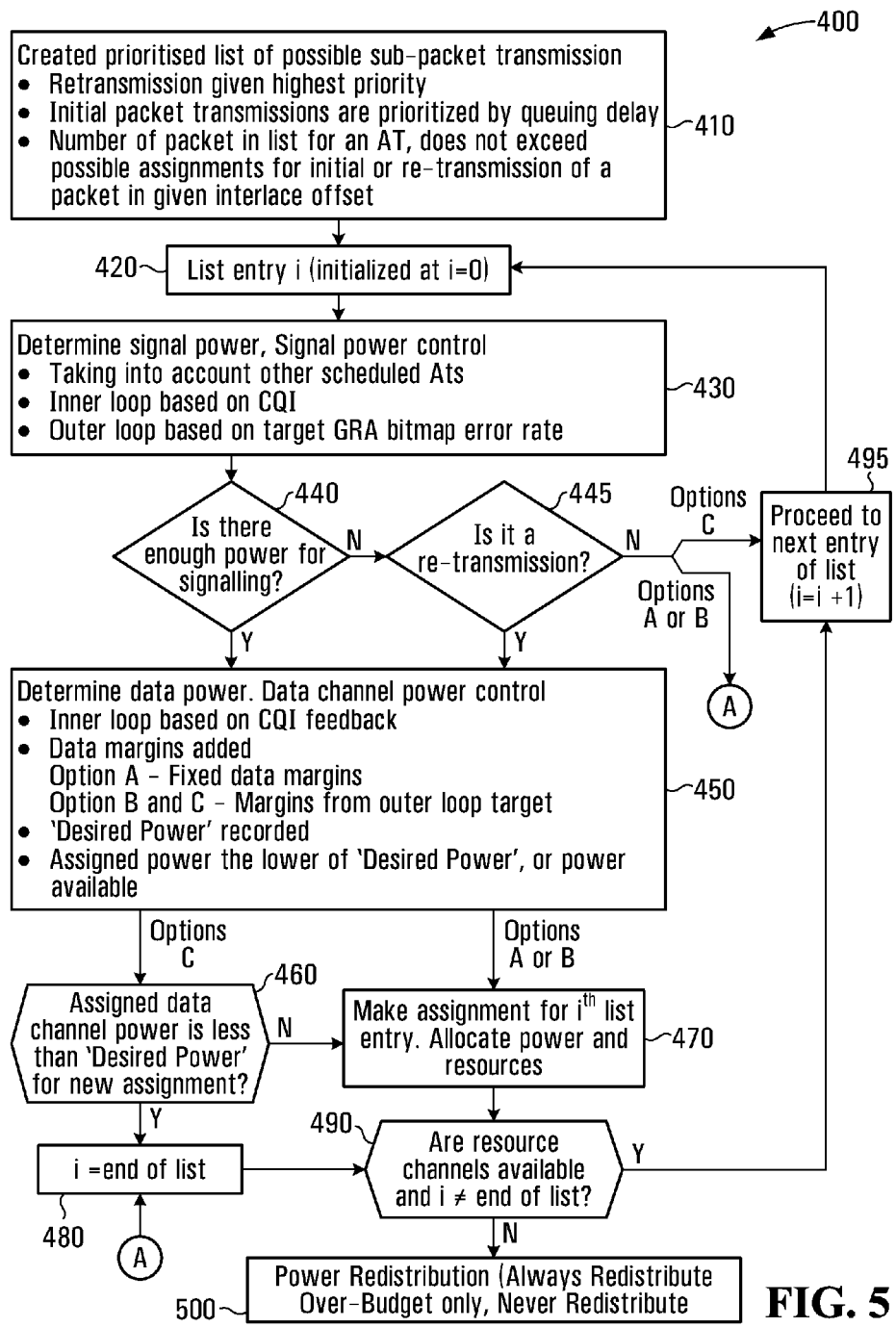
FIG. 5 is a flow chart for an example method for implementing scheduling and power control decisions according to an embodiment of the invention.

The flow chart in FIG. 5 provides a block representation 400 of the scheduling and power control decisions.

In block 410 a prioritized list is created for sub-packet transmission. In block 420, the list entry i is initialized at i=0. In block 430 signal power is determined. How signal power control is determined will be further defined below. In block 440 it is determined if there is enough power for signalling. If there is enough power for signalling (yes path from block 440), a next step 450 is determining data power. How data channel power control is determined will be further defined below. For scheduling and power redistribution there are three options. A first option, indicated as Option A involves redistribution of power for under-budget and over-budget conditions, a second option, indicated as Option B involves redistribution of power for over-budget conditions, but not when allocated power is less than the total available power, and a third option, indicated as Option C involves no redistribution of power, but uses initial power allocation from scheduling loops. Subsequent to determining data power 450 for Options A and B an assignment is made 470, for the $i^{th}$ list entry. For Option C it is determined 460 whether the assigned data channel power is less than a "desired power" for a new assignment. If the assigned data channel power is not less than a "desired power" for a new assignment (no path of 460) the method proceeds to block 470. If the assigned data channel power is less than a "desired power" for a new assignment (yes path of 460) the method proceeds to block 480, in which the $i^{th}$ entry is set to "end of list".

Subsequent to either of blocks 470 and 480, the next step 490 is determining whether resource channels are available and whether $i^{th}$ list entry is not equal to "end of list". If resource channels are available and the $i^{th}$ list entry is not equal to "end of list" (yes path of block 490), the method proceeds to a next entry on the list (block 495), i.e. i=i+1, and returns to block 420 wherein the process described above is repeated for the next entry. If resource channels are not available and the $i^{th}$ list entry is equal to "end of list", the method proceeds to a power redistribution scheme 500 that will be described with regard to FIG. 6 below.

Referring back to block 440, if there is not enough power for signalling (no path from block 440), a next step 445 is determining whether the $i^{th}$ entry is a retransmission. If the $i^{th}$ entry is a retransmission (yes path of block 445), the method continues to determining the data power in block 450. For Options A and B, if the $i^{th}$ entry is not a retransmission (no path of block 445), the method proceeds to block 480, in which the $i^{th}$ entry is set to "end of list". In some embodiments, in a modified version of Options A and/or B, it may be appropriate to continue to add assignments in cases where signalling power is larger. In such a case, the method proceeds to a next entry on the list (block 495), i.e. i=i+1, and returns to block 420 wherein the process described above is repeated for the next entry.

For Option C, if the $i^{th}$ entry is not a retransmission (no path of block 445), the method proceeds to a next entry on the list (block 495), i.e. i–i+1, and returns to block 420 wherein the process described above is repeated for the next entry.

Figure 6:
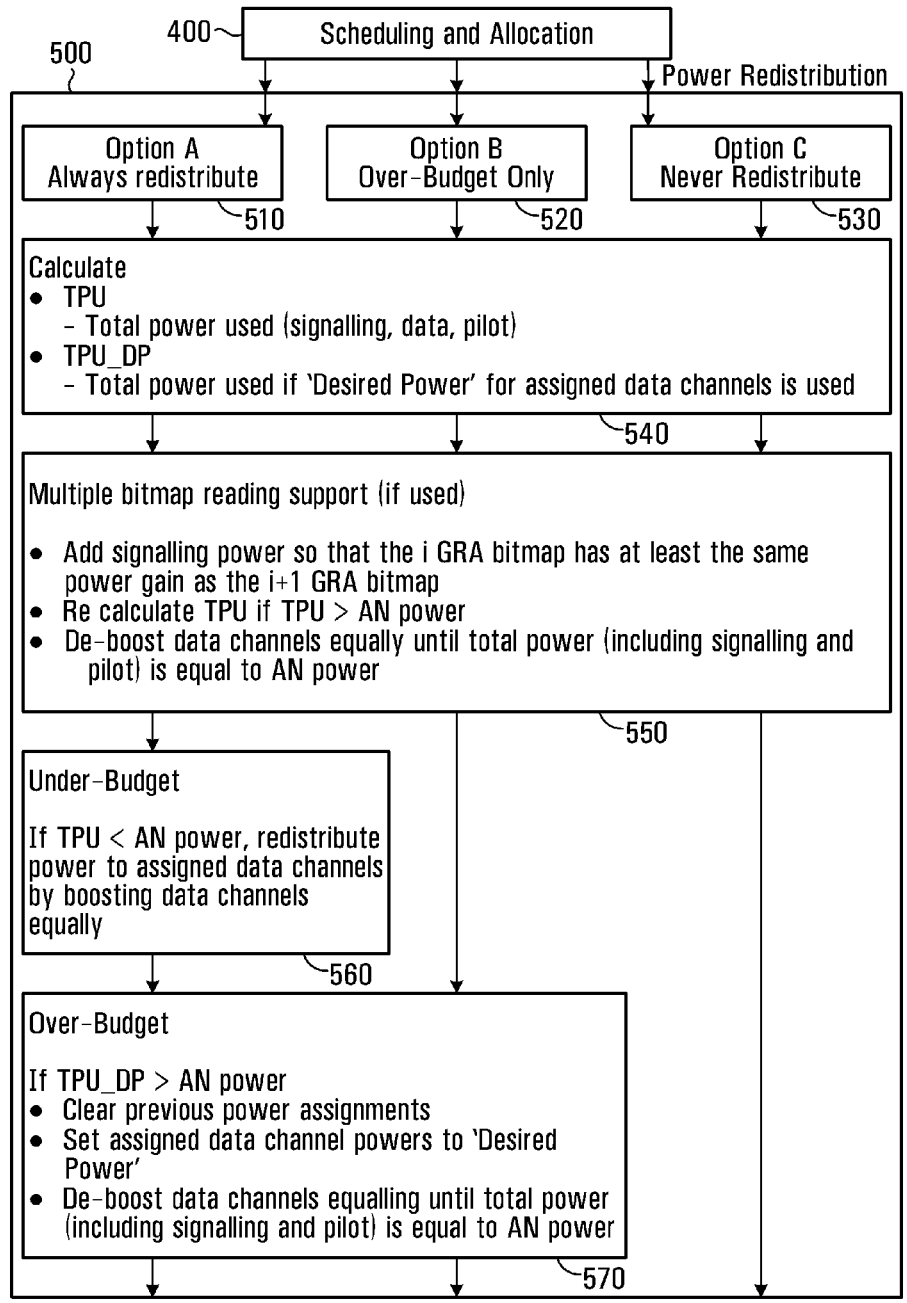
FIG. 6 is a flow chart for an example method for implementing power redistribution according to an embodiment of the invention.

The flow chart in FIG. 6 provides a block representation 500 of the power redistribution decisions.

In FIG. 6 there are three streams of processing shown that are reflective of which option, Options A, B or C, is selected for potential re-distribution of power.

For the Option A stream 510, the total power used and/or the total power used if "desired power" for assigned data channel is used is calculated at block 540. At block 550, if multiple bitmap reading support is used, signalling power is added so that the $i^{th}$ GRA bitmap has at least the same power gain as the i+1th GRA bitmap. The total power used may be recalculated if the total power used is less than power of an access node (AN), for example a base station. In some embodiments, power may be reduced for data channels equally until the total power, including signalling and pilot power, is equal to AN power. In a scenario in which the power is under-budget (block 560), i.e. if the total power used is less than the AN power, the power to the assigned data channels can be redistributed by boosting power to the data channels equally. In a scenario in which the power is over-budget (block 570), i.e. if the total power used if "desired power" for assigned data channels is more than the AN power, previous power assignments may be cleared, assigned data channel powers may be set to "desired power" and the power to the assigned data channels can be redistributed by reducing power to the data channels equally until the total power, including signalling and pilot power, is equal to AN power.

For the Option B stream 520, the total power used and/or the total power used if "desired power" for assigned data channel is used is calculated at block 540. At block 550, if multiple bitmap reading support is used, signalling power is added so that the $i^{th}$ GRA bitmap has at least the same power gain as the i+1th GRA bitmap. The total power used may be recalculated if the total power used is less than the AN power. In some embodiments, power may be reduced for data channels equally until the total power, including signalling and pilot power, is equal to AN power. In a scenario in which the power is over budget (block 570), previous power assignments may be cleared, assigned data channel powers may be set to "desired power" and the power to the assigned data channels can be redistributed by reducing power to the data channels equally until the total power, including signalling and pilot power, is equal to AN power.

For the Option C stream, the total power used and/or the total power used if "desired power" for assigned data channel is used is calculated at block 540. At block 550, if multiple bitmap reading support is used, signalling power is added so that the $i^{th}$ GRA bitmap has at least the same power gain as the i+1th GRA bitmap. The total power used may be recalculated if the total power used is less than the AN power. In some embodiments, power may be reduced for data channels equally until the total power, including signalling and pilot power, is equal to AN power. As no redistribution is done for Option C no under-budget or over-budget processing is performed as in Options A and B.

Referring again to FIG. 5, various steps of the flow cart will now be described in further detail.

With regard to block 410, in some implementations, a primary metric to determine VoIP performance is latency, and as such the primary scheduler criteria is packet delay. An AN assigns a priority to each packet waiting for initial transmission at the AN. In some embodiments, packets that have already been transmitted once or more, and are available for re-transmission are given priority over all others. If there are multiple groups in the interlace or interlace offset, ATs from all groups are put into a single list so that scheduling decisions are made for AT assignments from all groups. In some implementation, in order for an AT to be considered in the scheduling assignment flow for a given scheduling period, the AT must: a) be assigned a group in the given instance; b) for a possible first HARQ transmission of a packet: i) have a non-empty packet buffer at the AN; and/or ii) have an assignment with a first HARQ transmission opportunity in the given interlace offset, where the assignment is not being used for a re-transmission; c) for possible re-transmission of a packet, the packet must have not equalled or exceeded the maximum number of HARQ transmissions allowed. In addition, in some embodiments, the number of packets in the list for an AT is not too exceed a maximum number of assignment for initial or re-transmissions of a packet in a given interlace offset.

In general, a channel quality factor could be added to the delay priority to take advantage of favourable channel conditions. If a packet is delayed to a next opportunity, the additional delay may counteract any benefit of channel knowledge.

According to some embodiments, users may be scheduled in order of longest packet delay to shortest packet delay (i.e. delay priority). Packet delay may be measured from the time the packet arrives at the base station from the network until it is scheduled for transmission (i.e. the amount of time it spends in a queue).

In some embodiments, re-transmissions of a packet is given priority over new packet transmissions. In some embodiments, scheduling of users or packet transmissions is based on the following order: (1) Packets requiring re-transmissions and (2) New packet transmissions in order of delay priority. In some embodiments, HARQ re-transmissions of a VoIP packet occur regularly (synchronously).

Concurrent transmissions may also be used in some embodiments. A concurrent transmission is one where a user is assigned multiple packet transmission resources within the same scheduling interval and the packets need not overlap or being related in any way.

With regard to block 430, in some embodiments, signalling power required is calculated at least in part from the estimated CQI target, a signal to noise (SNR) threshold for a given control channel format, and a margin based on outer loop power control GRA bitmap error rate targets. As the GRA bitmap must reach all assigned ATs, the CQI target used is that of the scheduled AT with the poorest channel conditions in the group, and hence the signalling power required must take into account other ATs already scheduled.

For example, if the AT considered in the $i^{th}$ scheduling loop has better channel conditions than any of those ATs already selected in previous loops in the same group, the signalling power will not change by the addition of this AT. Thus, it is possible to add ATs without increasing the signalling power, if an AT is added that does not have the worst channel conditions of scheduled ATs of the group.

As multiple groups may be scheduled at one scheduling interval, the signalling power per group and worst AT per group is updated for each of the scheduling groups. Each group has its own outer loop power control margins.

If there is not enough power to reliably send the GRA bitmap to an AT for a given packet transmission, for example in response to block 440, it is removed from the list and the scheduler proceeds according to the specific scheduling option. In some embodiments this is implemented via block 480. However, in the case of a re-transmission, (yes path of 445) the packet transmission is scheduled regardless. In a scenario in which synchronous HARQ re-transmission is considered, a packet transmission cannot be delayed or re-scheduled.

In some embodiments, additional GRA bitmap power adjustments for reading multiple bitmap groups is completed in block 550 of the power redistribution process 500, after all scheduling steps are complete for simplicity.

With regard to block 450, the power required for a data channel is based on the estimated CQI of the intended AT, the SNR threshold of the desired modulation format, and a data margin. This step in the scheduling and allocation block serves to make an initial setting of data power levels for each assignment. Data channel powers may be adjusted after all scheduling steps are completed in the power redistribution block.

In some implementations, the data margins are set by one of two methods. A first method includes data margins based on outer loop control with a given termination target (e.g. 1% packet error rate (PER) after three transmissions. A second method includes using fixed data margins.

The outer loop control is adjusted based on the packet termination statistics. The target termination is predetermined, and the outer loop is used to maintain the target. If a high termination target is used, for example 10% residual PER after three transmissions, delays may increase as the number HARQ transmissions for each successful encoder packet transmission will increase. Likewise, if a low target such as 0.1% after three transmissions is used, fewer HARQ transmissions are needed per successful encoder packet transmission. Lower margins decrease transmission delays per encoder packet, but require more power per transmission. This may result in fewer packets being scheduled per scheduling interval due to power limitations.

Fixed data margins are set based on CQI reliability and a rough estimate of a packet transmission termination target. The value of the margins has an impact on how many assignments can be scheduled in a given scheduling interval due to power limitations. It can be advantageous to use fixed margins with redistribution of available AN power to the data channels, so that so that the lowest termination target is always assured.

It is possible in the GRA bitmap control channel signalling scheme to add a transmission to an AT without requiring additional signalling power, but then not be able to assign any power to the data channel if all AN power is already assigned. In this case, re-distribution of power over data channels may be advantageous, and is discussed below. If re-distribution is not used, then new packet transmissions (and thus excluding re-transmissions) should not be scheduled unless some power is available for the data channel.

According to some embodiments, packet transmissions are assigned resources by the scheduler in the following manner:
(1) Packet transmissions are ordered based on some priority scheme, for example delay priority. Other priority schemes known in the art of scheduling may also be used, however.
(2) Starting with the highest priority transmission:
  (i) The power required for control channel signalling, for the already scheduled transmission, is then determined;
  (ii) If sufficient power is available, the user is assigned resources for packet. The power for data transmission is then determined, which power may be based on Desired_ data_power, and assigned to the packet transmission;
  (iii) If sufficient power is not available for control channel signalling, the scheduler does not assign resources for this packet transmission, and proceeds to evaluate the next highest priority user;
  (iv) If there is still power and resources available, the process repeats for the next highest priority transmissions.

According to some embodiments, packet transmissions are assigned resources by the scheduler in the following manner:
(1) Packet transmissions are ordered based on some priority;
(2) Starting with the highest priority transmission:
  (i) The power required for control channel signalling, for the already scheduled transmission, is then determined;
  (ii) If sufficient power is available, the user is assigned resources for packet transmission;
    The power for data transmission is then determined, which power may be based on Desired_data_power, and assigned to the packet transmission;
  (iii) If sufficient power is not available for control channel signalling;
    In case of a retransmission, the required control signalling power is incremental decreased until the total power constraint is satisfied;
    In the case of a new transmission, the scheduler does not assign resources for this packet transmission, and proceeds to evaluate the next highest priority user;
  (iv) If there is still power and resources available, the process repeats for the next highest priority transmissions.

According to some embodiments, the user feeds back CQI information from which the desired transmit power level (Desired_data_power) may be derived.

In some embodiments, the desired power level is difference between the target threshold and the user CQI.

The target threshold can be the power needed to achieve a particular performance target, for example, a termination target of 0.5% after three HARQ transmissions.

In some embodiments, a margin may be added to the target threshold based on an outer loop power control system, and may be different for each user, or data rate, or packet format, or mobile speed, etc. In some embodiments, a fixed margin may be added to the target threshold. In some embodiments, the user feedback is based on the most recent estimate of the CQI. In other embodiments where the user CQI estimates are assumed to be less reliable, the CQI feedback may be based on an average of recent CQI estimates.

According to some embodiments, after initial assignment of power and resources to scheduled packet transmissions, if total power assigned is less than the total power available, the extra available power may be distributed among the scheduled packet transmissions.

As discussed above, after data channels have been allocated and scheduling is complete, there is an opportunity to redistribute power among the assigned data channels. Power can be redistributed if the power is:

Under budget: the calculated power required for pilot, data and signalling does use the total power of the AN. Power can then be redistributed to the scheduled data channels to aid in early termination of transmissions. Power is redistributed equally across assigned data channels using a single multiplicative factor. This leads to nearly full power AN transmission in every slot (limited by maximum subcarrier or other power control limits).

Over-budget: the calculated power required for pilot, signalling and data using "desired powers" for data is greater than the total power of the AN. Data powers are reset, and available data power for all channels is distributed in a weighted manner per data channel based on fixed portion of "desired powers" for each packet transmission. Final power gain allocations to data channels are desired power gains, equally reduced by a single multiplicative factor. This process ensures that every data transmission receives some power, even those scheduled without data power in the initial allocation process.

If redistributing of power is not used in this "over-budget" condition, it is recommended NOT to schedule new packet transmission without data channel power.

If multiple bitmap reading is enabled, bitmaps intended for ATs with lower geometries must always be able to be read by ATs that are part of high-geometry GRA bitmap groups. Considering a set of AT groups, ordered by geometry from lowest geometry to highest geometry, the ATs of the $i^{th}$ bitmap group must always be able to be read by the $i^{th}+1$ bitmap. The $i^{th}$ GRA bitmap must therefore be sent with at least a power gain of the $i^{th}+1$ bitmap. As some ATs receive GRA bitmaps with relatively high PER's, the reliability of correct reception of lower geometry GRA bitmaps needs to be ensured. Hence, the $i^{th}$ GRA bitmap maybe sent with a higher power gain than the $l"+1$ GRA bitmap to ensure reliability, or the $i^{th}$ bitmap may be sent at the same gain but with a more reliable coding and modulation format.

The power level of the GRA bitmaps are adjusted to ensure the reliability of multiple bitmap reading within the power redistribution stage of allocation. If there is not enough AN power available for this adjustment, data channels are de-boosted equally by a multiplicative factor to meet power constraints.

It may be beneficial to include the additional power needed for multiple bitmap reading in the signalling power estimation of the scheduling loops; however this step is included after scheduling, and during power redistribution in this study for simplicity and ease of comparison to other methods.

The use of the scheduling and redistribution methods leads to three scheduling and power redistribution options listed and briefly described below. The processes for these options are explicitly shown in the flow charts on scheduling and allocation flow (FIG. 5) and power redistribution (FIG. 6).

As discussed above Option A pertains to always redistributing power over data channels in both under-budget and over-budget conditions. Fixed data margins are used as power will be re-distributed to ensure lowest possible termination target, regardless of power budget. In the scheduling loops, allow initial packet transmissions for which there is signalling power, but no available data channel power during initial allocation.

Option B pertains to redistributing power when the over-budget conditions applies, but not redistributing when allocated power is less then total available power. Data margins are based on outer loop control with a given termination target near 1% after three transmissions. In the scheduling loops, allow initial packet transmissions for which there is signalling power, but no available data channel power during initial allocation.

Option C pertains to not redistributing power and using initial power allocations from scheduling loops. In the scheduling loops, do not allow new packet transmissions to be scheduled without allocating appropriate data channel power. Data margins are based on outer loop control with a given termination target near 1% after three transmissions.

All three options allow re-transmissions regardless of signalling power or data channel power availability as there is no opportunity to re-schedule as re-transmissions are synchronous.

Option A is simplest to use. This scheme does not require prior knowledge of loading or a termination target. Option A is suitable for all VoIP traffic, and in cases where always transmitting at or near full AN power is acceptable.

Option B is a variant of Option A that can be used for mixed traffic, or in cases where transmitting at full power is undesirable. This scheme requires selection of a termination target for the outer power control function of the data channel margins. If left-over power is to be used for other traffic transmissions, careful selection of the termination target is required. In some embodiments Option B is a likely candidate for implementation.

Option C is a basic scheme where data channels are assigned power as calculated from inner and outer loop power control algorithms without redistribution of power among data channels. Selection of a proper termination target is critical to the efficient performance of this scheme. This option ensures that each new assignment receives data power allocation of exactly what is calculated from the power control loops, or the packet transmission is delayed to next opportunity.

In some implementation, Options A and B exit the scheduling loop as soon as there is an entry for which there is not sufficient power for the signalling for a new assignment. The reason for not proceeding to other entries on the list is that power is later redistributed among the all the assigned data channels in these two options. Therefore, adding new assignments after this point results in adding lower priority assignments at the expense of decreased power to the higher priority assignments, hence the scheduling decision implemented is to stop adding assignments at this point.

For Option B, for some implementations it may be appropriate to continue to add assignments after this point in cases when signalling power is larger. This is denoted in FIG. 6 as a 'Mod-B'. In this case, the scheduler continues to loop through all possible assignments on the priority list. Note that the same modification can be made for Option A.

In some implementations Option C continues to evaluate possible assignments as long as there is sufficient available AN power for the desired data channel power. Once all AN power has been allocated, the allocation procedure stops. Power is not redistributed in Option C.

In some embodiments, the fraction of the extra available power allocated to each of the packet transmissions may be proportional to the relative values of Desired_data_power. In some embodiments, the fraction of the extra available power allocated to each of the packet transmissions may be proportional to the relative values of Desired_data_power_factor where Desired_data_powerfactor=Desired_data_power/num_of_resources_assigned.

According to some embodiments, after initial assignment of power and resources to scheduled packet transmissions, if the sum of the control channel signalling for assigned transmissions and the sum of the Desired_data_powers (or power assigned based on Desire_data_powers), called Total_desired_power (or total power assigned), for assigned transmissions is more than the total power available, each transmission may be temporarily assigned the respective Desired_data_power value. The additional power may then be removed from the assigned powers for each packet transmission in a distributed fashion such until the total power assigned is equal or less than the total power available.

In some embodiments, the fraction of the power removed from each of the packet transmission may proportional to the relative values of Desired_data_power.

Group signalling may be used to signal one or more users at a time. The group signalling may indicate which mobiles are assigned resources, and which resources are assigned to a given user. According to some embodiments, grouped signalling can be in the form of a bitmap.

A set of ATs are assigned to a group which is signalled by a GRA bitmap transmission. A group is assigned an interlace in which the group is signalled and receives all packet transmissions. The group is assigned resources per interlace offset, in its assigned interlace. If multiple groups per interlace offset are used, most commonly the ATs are sorted into groups based of their geometries. By sorting ATs into groups by geometries, the GRA bitmap scheme becomes more power efficient as a smaller bitmap can now be sent to the group of ATs with the lowest geometries.

AT assignments are also assigned interlace offsets, within an interlace, for the first HARQ transmissions opportunity of packet transmissions. As mentioned earlier, the set of assignments to an interlace offset his known as a subgroup.

There can be advantages to scheduling subgroups based on geometry so that low, medium, and high geometry users form three separate subgroups. Users that have high geometry are users that have good long-term channel conditions for communicating with their serving base station. Therefore, it is desirable in some situations to provide bitmaps for users with generally good channel conditions. If multiple bitmap groups per interlace offset are implemented, it is a natural extension that each group is also a subgroup, so that the each geometry-based bitmap has its first assignment on a different interlace offset. If the first transmission is persistently assigned, there can be a benefit as signalling may not have to be sent to the lowest geometry group for one or more of three interlaces offsets, as there is some probability that all assigned VoIP transmissions of this bitmap will not require a third HARQ transmission.

It may be advantageous to consider geometry based interlaces, however, it may be possible to overload an interlace with low geometry ATs such that there is insufficient power for data transmissions. The geometry-based interlace offset group scheduling considered for implementation in this document assumes uniform distribution of ATs of all geometries across the three interlaces.

In some embodiments, if a particular HARQ transmission is persistently assigned for a given user, grouped signalling will not be required to reliably reach that user for that HARQ transmission. For example, in the cases of persistently assigned transmissions, users do not need to receive the bitmap for the first HARQ transmission of a packet as the location of the resources assigned, if any, is known.

In some embodiments, the grouped signalling scheme is sent for each HARQ transmission that is not persistently assigned.

According to some embodiments, users may be assigned to groups using the following schemes. Grouped control channel signalling may be used to signal a user group. Users may be divided into signalling groups based on geometry, channel types, MCS, or otherwise. For example, users may be grouped into three groups: low geometry, medium geometry and high geometry. Each group may be signalled by separate grouped signalling messages.

In some embodiments, users assigned to a given signalling group may have their first HARQ transmission opportunities in the same interlace offset. In some embodiments all users assigned to a given group have all of their first HARQ transmission opportunities in the same interlace offset.

If the first transmission for all users is persistently assigned, then the bitmap may not need to be sent for the associated interlace offset.

In some embodiments, each grouped signalling message is associated with a different interlace offset. In some embodiments, the number of signalling groups is equal to the number of interlace offsets for a given interlace.

Figure 4:
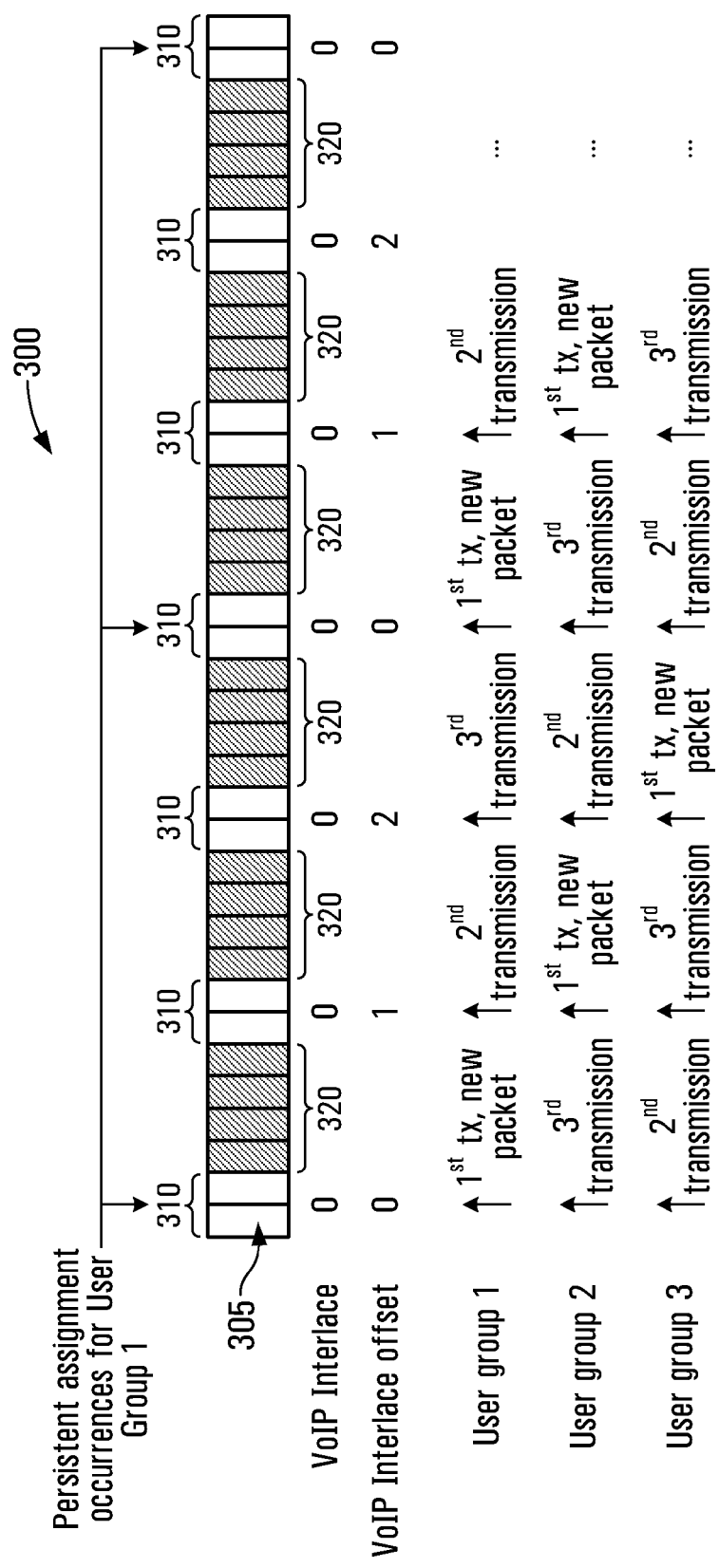
FIG. 4 is a schematic diagram of VoIP frame structure for group signalling according to an aspect of the present invention.

FIG. 4 shows an example group signalling involving bitmaps using three interlace offsets (0, 1 and 2) and three bitmaps with users of each bitmap assigned to begin a first HARQ transmission on a different interlace offset. FIG. 4 is similar in format to FIG. 2 in that each rectangular block 305 is a frame and multiple frames make up the TDM slots 310, 320.

If the first transmission is persistently assigned, then during interlace offset 0, bitmap 0 need not be signalled unless a packet transmission exceeds three HARQ transmissions. This can be very advantageous to reduce overhead if the users have been divided into bitmap groups based on geometry, as signalling may be omitted or reduced for all low geometry users (for example) during one the interlace offsets.

In some embodiments, the assignment of groups or bitmaps is based on geometry or other criteria, but assignment may proceed in a manner to ensure nearly uniform distribution of users in each bitmap In some embodiments, the number of users groups or bitmaps may be less the number of interlace offsets. In some embodiments, only the group or bitmap associated with the lowest geometry users is persistently assigned for its first HARQ transmission.

In some embodiments, signalling groups or bitmaps which include sub-groups of users, with each sub-group having it first HARQ transmission associated with a different VoIP interlace offset, may be used. In some embodiment of this case, the users are assigned to one the subgroups based on geometry.

For example, in a case with three interlace offsets and two bitmaps. The low geometry users are assigned to bitmap 0, and assigned to have their first HARQ transmission on interlace offset 0. The medium and high geometry user groups are both assigned to bitmap 1, however, the medium geometry user group is assigned to have their first HARQ transmission on interlace offset 1, and the high geometry user group is assigned to interlace offset 2.

Referring again to FIG. 4, the transmission numbers indicate transmission opportunities. If a packet is successfully received after its second transmission, for example, a third transmission is not required.

Note that User group 1 is assigned to Interlace offset 0 in this example, and therefore begins a new packet at occurrences of interlace offset 0. It is possible to configure a system where the maximum number of HARQ retransmissions is greater than the number interlace offsets. In this case for User Group 1 for example, interlace offset 0 can either be the first transmission of a packet, or the fourth transmission of a packet. Note, similar figures can be drawn for operations in Interlace 1 and 2 (only Interlace 0 is shown).

Description of Example Components of a Communication System

Figure 7:
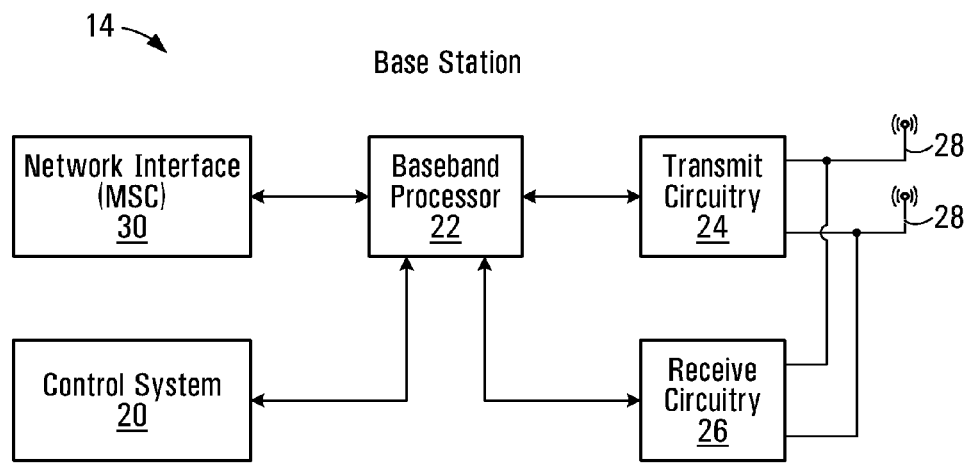
FIG. 7 is a block diagram of an example base station that might be used to implement some embodiments of the present invention.

A high level overview of the mobile terminals 16 and base stations 14 upon which aspects of the present invention are implemented is provided prior to delving into the structural and functional details of the preferred embodiments. With reference to FIG. 7, a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 1). A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) will amplify the modulated carrier signal to a level appropriate for transmission, and deliver the modulated carrier signal to the antennas 28 through a matching network (not shown). Various modulation and processing techniques available to those skilled in the art are used for signal transmission between the base station and the mobile terminal.

Figure 8:
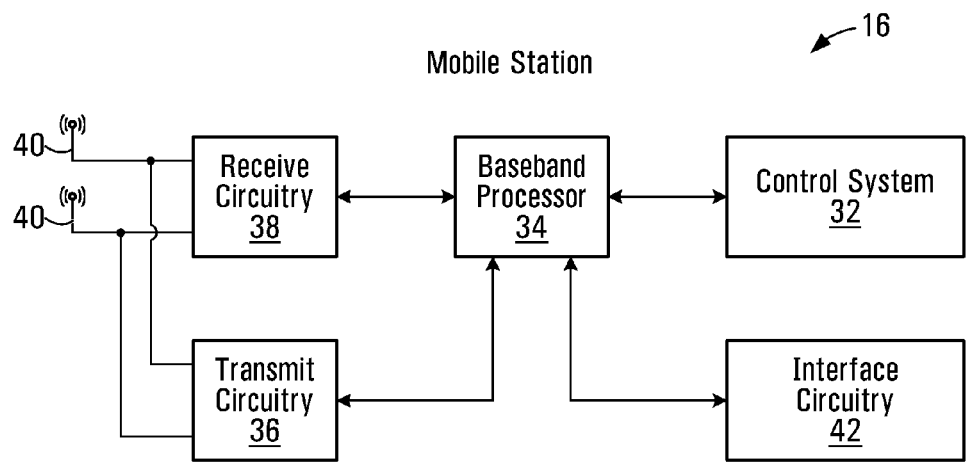
FIG. 8 is a block diagram of an example wireless terminal that might be used to implement some embodiments of the present invention.

With reference to FIG. 8, a mobile terminal 16 configured according to one embodiment of the present invention is illustrated. Similarly to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14. A low noise amplifier and a filter (not shown) may co-operate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, data, or control information, from the control system 32, which it encodes for transmission. The encoded data is output to the transmit circuitry 36, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are used for signal transmission between the mobile terminal and the base station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform (IFFT) on the information to be transmitted. For demodulation, the performance of a Fast Fourier Transform (FFT) on the received signal recovers the transmitted information. In practice, the IFFT and FFT are provided by digital signal processing carrying out an Inverse Discrete Fourier Transform (IDFT) and Discrete Fourier Transform (DFT), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 14 to the mobile terminals 16. Each base station 14 is equipped with "n" transmit antennas 28, and each mobile terminal 16 is equipped with "m" receive antennas 40. Notably, the respective antennas can be used for reception and transmission using appropriate duplexers or switches and are so labeled only for clarity.

Figure 9:
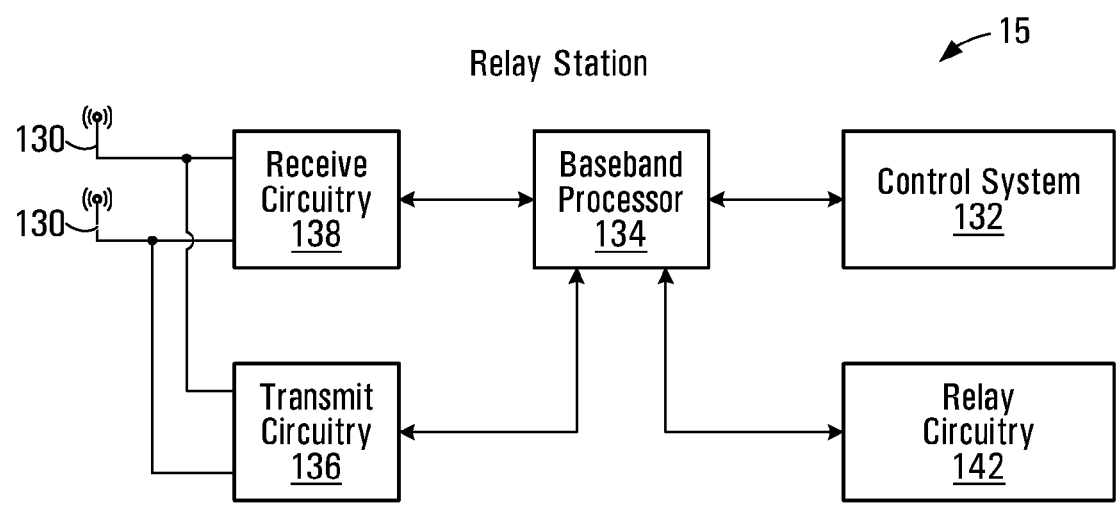
FIG. 9 is a block diagram of an example relay station that might be used to implement some embodiments of the present invention.

With reference to FIG. 9, an exemplary relay station 15 is illustrated. Similarly to the base stations 14, and the mobile stations 16, the relay station 15 includes a control system 132, a baseband processor 134, transmit circuitry 136, receive circuitry 138, multiple antennas 130, and relay circuitry 142. The relay circuitry 142 enables the relay station 15 to assist in communications between one of the base stations 14 and one of the mobile stations 16, The receive circuitry 138 receives radio frequency signals bearing information from one or more of the base stations 14 and the mobile stations 16. A low noise amplifier and a filter (not shown) may cooperate to amplify and remove broadband interference from the signal for processing.

Downconversion and digitization circuitry (not shown) will then downconvert the filtered, received signal to an intermediate or baseband frequency signal, which is then digitized into one or more digital streams.

The baseband processor 134 processes the digital streams to extract information or data bits conveyed in the signal. This processing typically comprises demodulation, decoding, and error correction operations. The baseband processor 134 is generally implemented in one or more digital signal processors (DSPs) and application specific integrated circuits (ASICs).

For transmission, the baseband processor 134 receives digitized data, which may represent voice, video, data, or control information, from the control system 132, which it encodes for transmission. The encoded data is output to the transmit circuitry 136, where it is used by a modulator to modulate one or more carrier signals at a desired transmit frequency or frequencies. A power amplifier (not shown) will amplify the modulated carrier signals to a level appropriate for transmission, and deliver the modulated carrier signal to the antennas 130 through a matching network (not shown). Various modulation and processing techniques available to those skilled in the art may be used for signal transmission between the mobile stations 16 and the base stations 14, either directly or indirectly via the relay stations 15, as described above.

Figure 10:
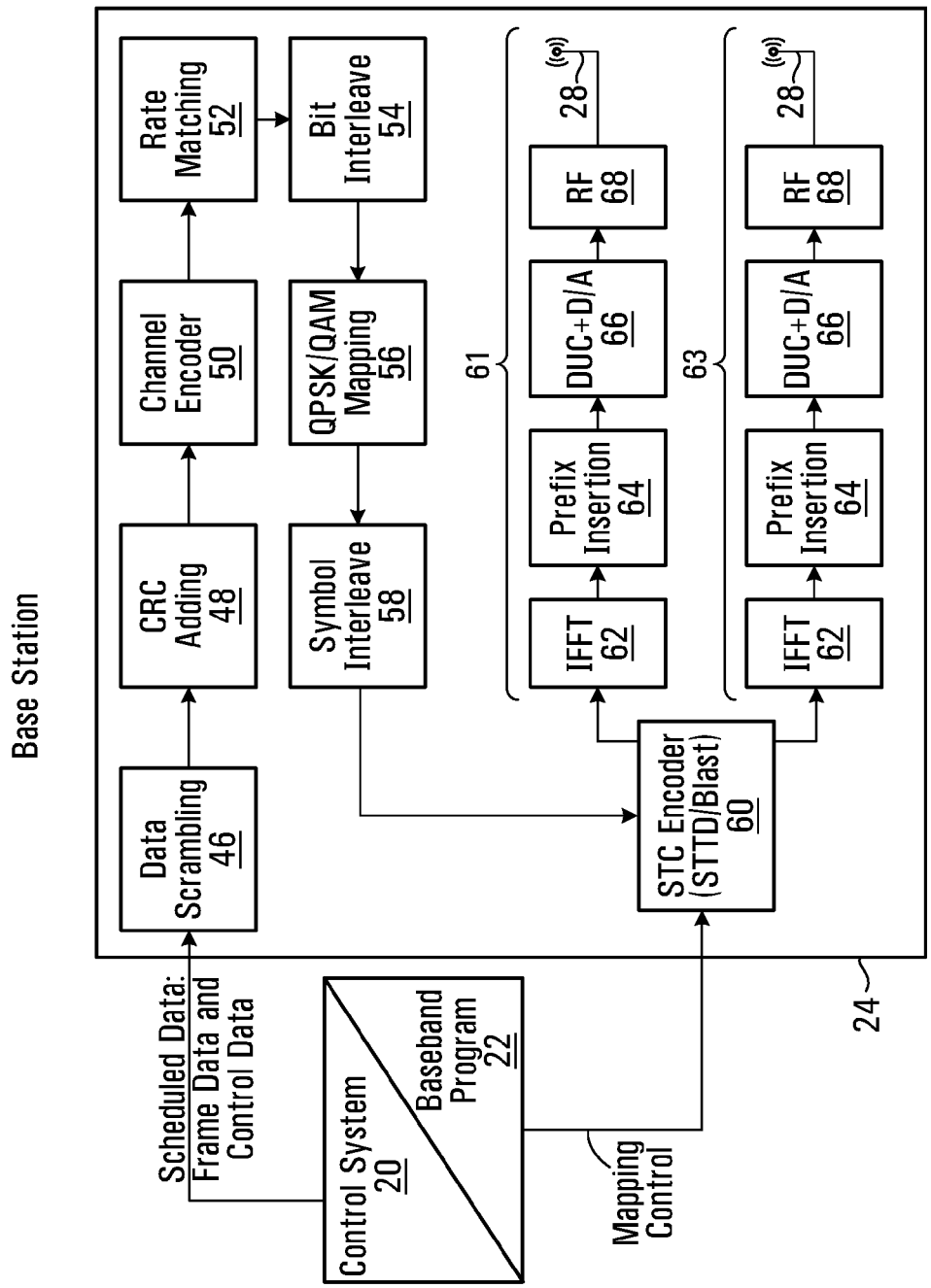
FIG. 10 is a block diagram of a logical breakdown of an example OFDM transmitter architecture that might be used to implement some embodiments of the present invention.

With reference to FIG. 10, a logical OFDM transmission architecture will be described. Initially, the base station controller 10 will send data to be transmitted to various mobile terminals 16 to the base station 14. The base station 14 may use the channel quality indicators (CQIs) associated with the mobile terminals to schedule the data for transmission as well as select appropriate coding and modulation for transmitting the scheduled data. The CQIs may be directly from the mobile terminals 16 or determined at the base station 14 based on information provided by the mobile terminals 16. In either case, the CQI for each mobile terminal 16 is a function of the degree to which the channel amplitude (or response) varies across the OFDM frequency band.

Scheduled data 44, which is a stream of bits, is scrambled in a manner reducing the peak-to-average power ratio associated with the data using data scrambling logic 46. A cyclic redundancy check (CRC) for the scrambled data is determined and appended to the scrambled data using CRC adding logic 48. Next, channel coding is performed using channel encoder logic 50 to effectively add redundancy to the data to facilitate recovery and error correction at the mobile terminal 16. Again, the channel coding for a particular mobile terminal 16 is based on the CQI. In some implementations, the channel encoder logic 50 uses known Turbo encoding techniques. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation (QAM) or Quadrature Phase Shift Key (QPSK) modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code (STC) encoder logic 60, which modifies the symbols in a fashion making the transmitted signals more resistant to interference and more readily decoded at a mobile terminal 16. The STC encoder logic 60 will process the incoming symbols and provide "n" outputs corresponding to the number of transmit antennas 28 for the base station 14. The control system 20 and/or baseband processor 22 as described above with respect to FIG. 7 will provide a mapping control signal to control STC encoding. At this point, assume the symbols for the "n" outputs are representative of the data to be transmitted and capable of being recovered by the mobile terminal 16.

For the present example, assume the base station 14 has two antennas 28 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by prefix insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 28. Notably, pilot signals known by the intended mobile terminal 16 are scattered among the sub-carriers. The mobile terminal 16, which is discussed in detail below, will use the pilot signals for channel estimation.

Figure 11:
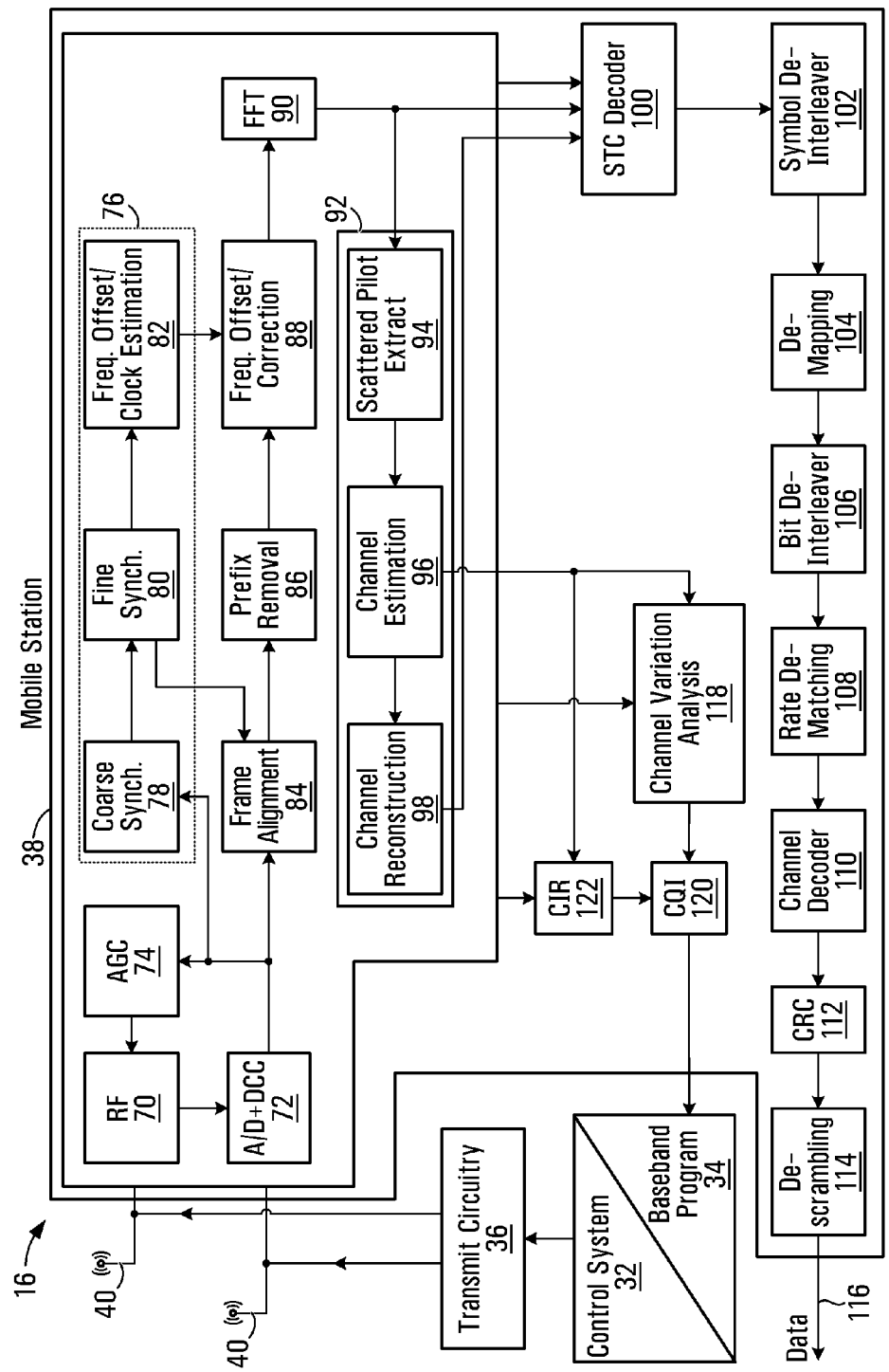
FIG. 11 is a block diagram of a logical breakdown of an example OFDM receiver architecture that might be used to implement some embodiments of the present invention.
Figure 12:
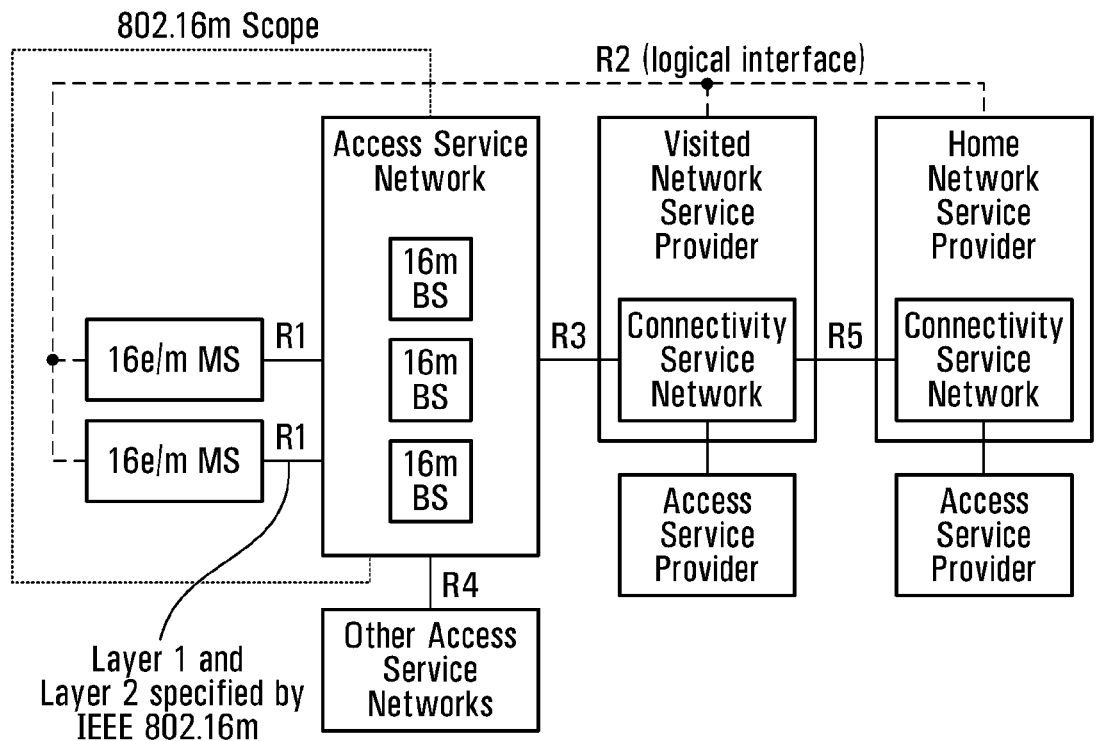
FIG. 12 is a schematic drawing of a network architecture implemented by the cellular communication system shown in FIG. 1 and corresponds to FIG. 1 of IEEE 802.16m-08/003r1.
Figure 13:
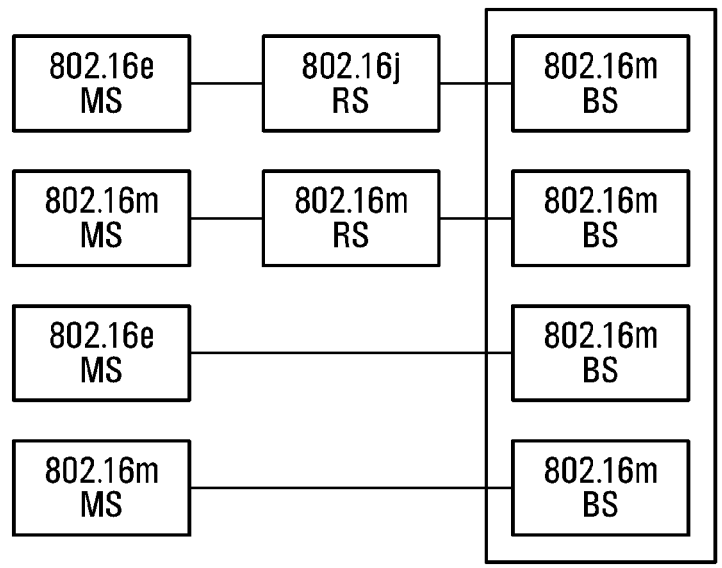
FIG. 13 is a schematic drawing of an architecture of the Relay Station shown in FIG. 9 and corresponds to FIG. 2 of IEEE 802.16m-08/003r1.
Figure 14:
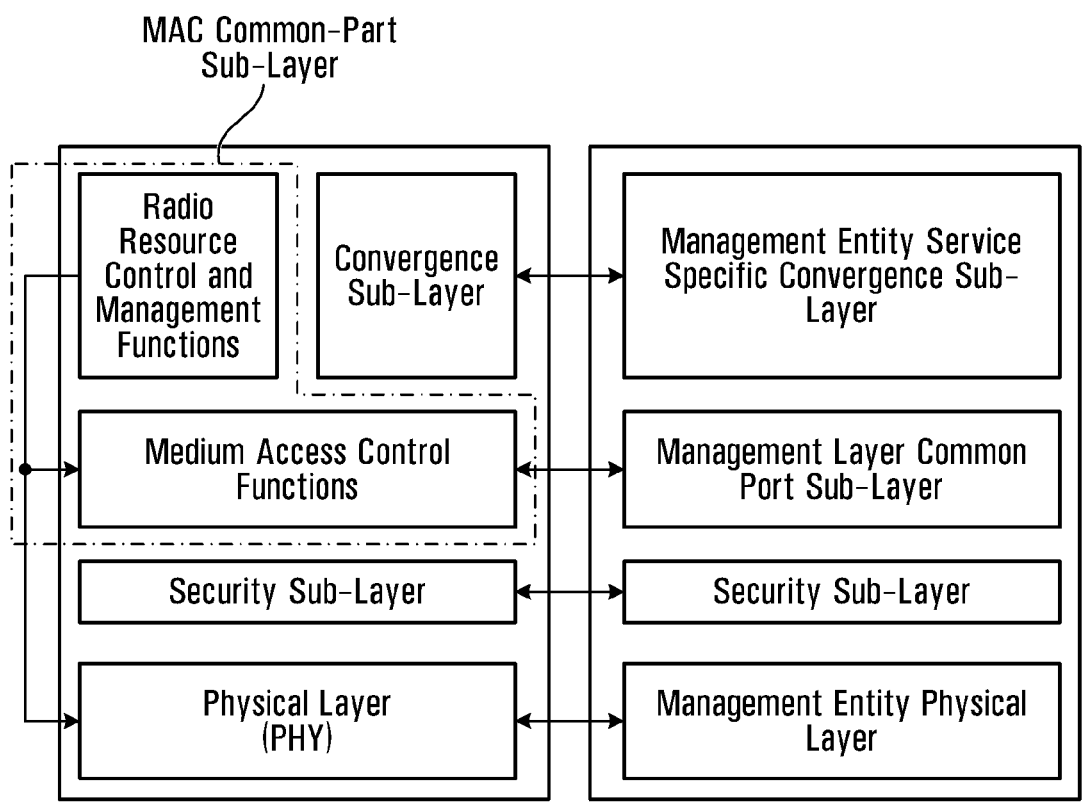
FIG. 14 is a schematic representation of a System Reference Model of the cellular communication system in FIG. 1 and of corresponds to FIG. 3 of IEEE 802.16m-08/003r1.
Figure 15:
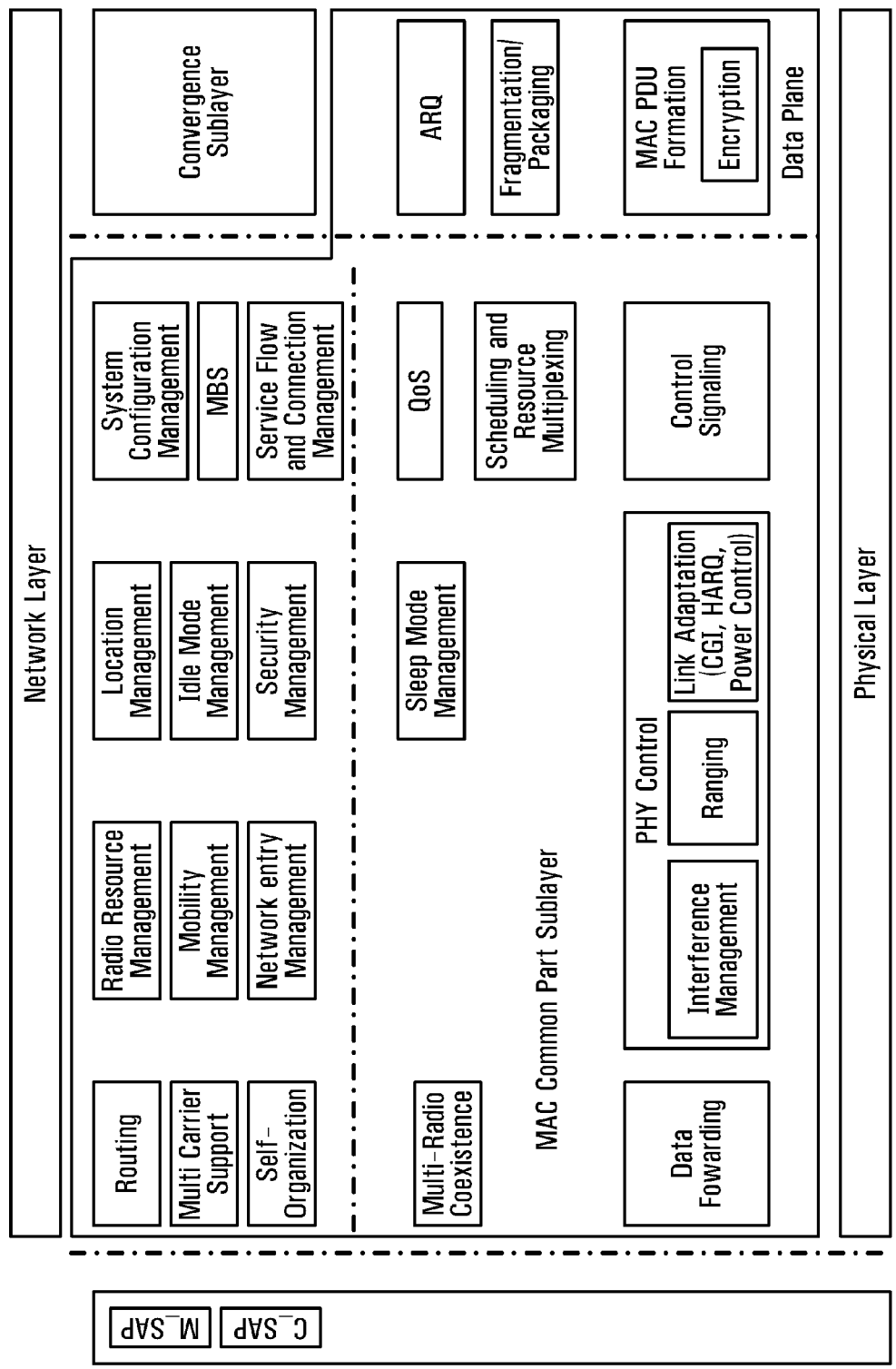
FIG. 15 is a schematic representation of a Protocol Structure in accordance with IEEE802.16m and corresponds to FIG. 4 of IEEE 802.16m-08/003r1.
Figure 16:
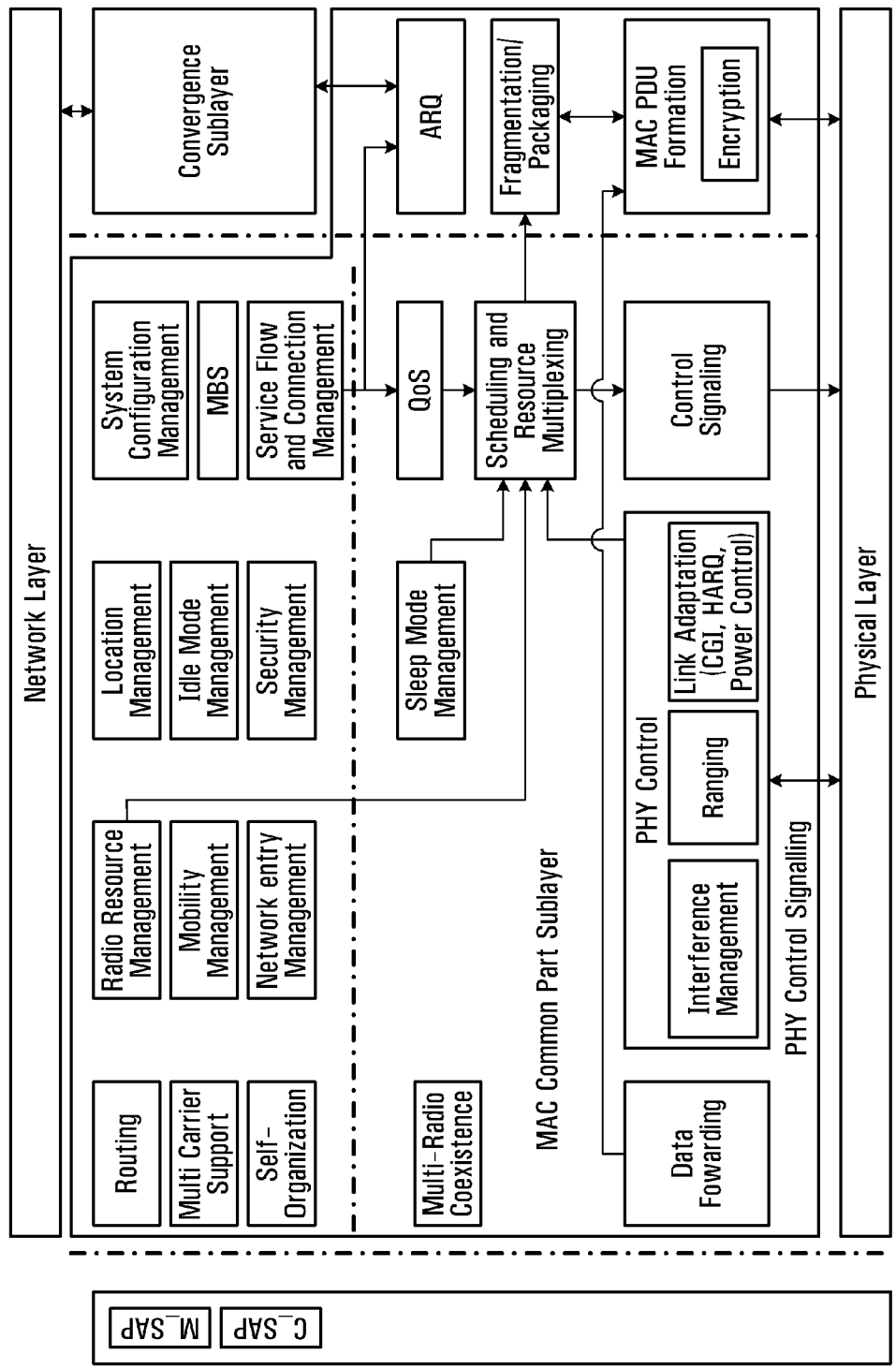
FIG. 16 is a Processing Flow diagram of a MS/BS Data Plane in accordance with IEEE802.16m and corresponds to FIG. 5 of IEEE 802.16m-08/003r1.
Figure 17:
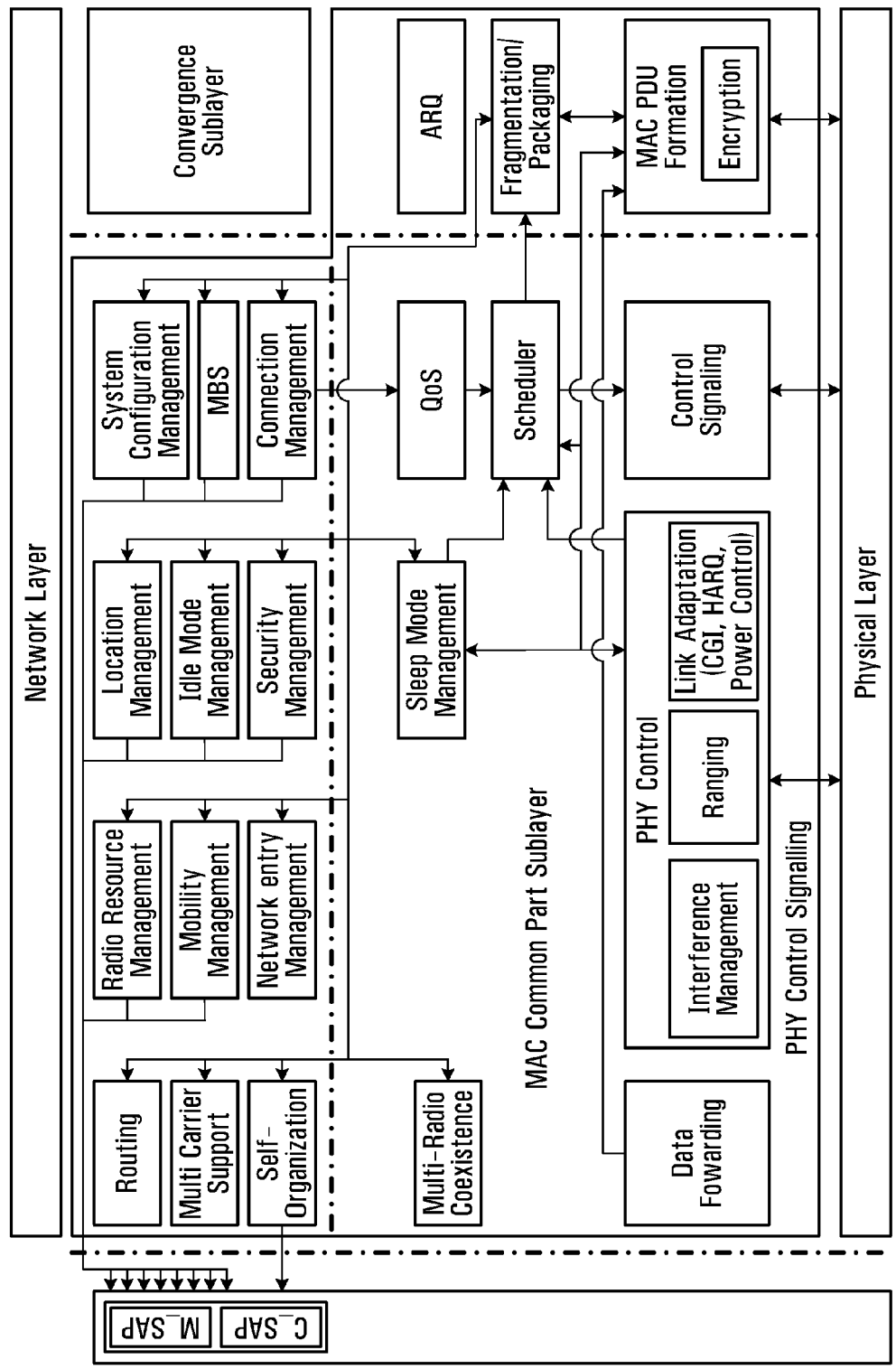
FIG. 17 is a Processing Flow diagram of a MS/BS Control Plane in accordance with IEEE802.16m and corresponds to FIG. 6 of IEEE 802.16m-08/003r1.
Figure 18:
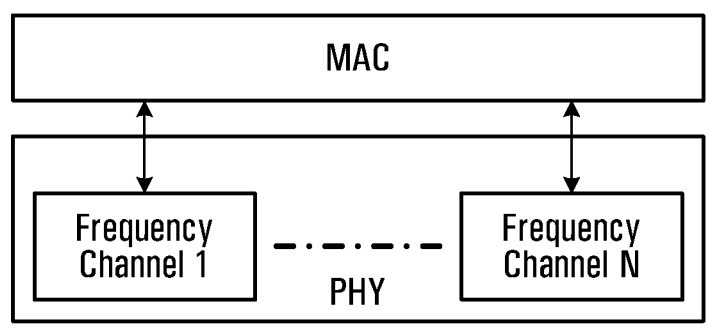
FIG. 18 is a schematic representation of a generic protocol architecture to support a multicarrier system and corresponds to FIG. 7 of IEEE 802.16m-08/003r1.

Reference is now made to FIG. 11 to illustrate reception of the transmitted signals by a mobile terminal 16. Upon arrival of the transmitted signals at each of the antennas 40 of the mobile terminal 16, the respective signals are demodulated and amplified by corresponding RF circuitry 70. For the sake of conciseness and clarity, only one of the two receive paths is described and illustrated in detail. Analog-to-digital (A/D) converter and down-conversion circuitry 72 digitizes and downconverts the analog signal for digital processing. The resultant digitized signal may be used by automatic gain control circuitry (AGC) 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an auto-correlation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. Continuing with FIG. 11, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

In parallel to recovering the data 116, a CQI, or at least information sufficient to create a CQI at the base station 14, is determined and transmitted to the base station 14. As noted above, the CQI may be a function of the carrier-to-interference ratio (CR), as well as the degree to which the channel response varies across the various sub-carriers in the OFDM frequency band. The channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

FIGS. 1 and 7 to 11 each provide a specific example of a communication system or elements of a communication system that could be used to implement embodiments of the invention. It is to be understood that embodiments of the invention can be implemented with communications systems having architectures that are different than the specific example, but that operate in a manner consistent with the implementation of the embodiments as described herein.

FIGS. 12 to 18 correspond to FIGS. 1 to 7 of IEEE 802.16m-08/003r1. The description of these drawings is incorporated herein by reference.

The description above describes a mechanism for resource allocation of services including VoIP. More generally, mechanism described here may also be directed to continuous and real time services, such as, but not limited to video telephony (VT), and UL gaming. In some embodiments, the methods described herein may aid in improving the flexibility of assigning resources for continuous and real time services.

Methods described herein may be implemented in software, hardware, or some combination thereof. For example, in a software implementation the processes are implemented as one or more software modules and the ordering functionality is implemented as another module. In a hardware implementation, the various signal comparison processing and ordering functionality may be implemented using, for example, but not limited to, an ASIC or a FPGA. In a software implementation, a computer-readable medium has stored thereon computer executable instructions, that when executed by a computer, cause the computer to implement the described method.

Numerous modifications and variations of the present invention are possible in light of the above teachings. It is therefore to be understood that within the scope of the appended claims, the invention may be practised otherwise than as specifically described herein.

The invention claimed is:

1. A method comprising:
   prioritizing a plurality of packets for potential transmission;
   in an iterative fashion:
   determining power requirements for control channel signalling associated with a highest priority packet not yet analyzed for resource assignment; and
   assigning resources for said highest priority packet if sufficient power for control channel signalling is available and sufficient resources for said highest priority packet are available;
   wherein said determining power requirements comprises reducing said power requirements for said control channel signalling until said power requirements are less than or equal to the available power;
   wherein reducing said power requirements is performed only for retransmissions.

2. The method of claim 1 wherein assigning resources is further dependent on sufficient power for transmitting said packet.

3. The method of claim 1 further comprising distributing to one or more of said plurality of packets excess power remaining after assigning resources.

4. The method of claim 1 further comprising reducing power assignments for one or more of said plurality of packets prior to transmission.

5. The method of claim 1, wherein the method is for use with a handset.

6. A transmitter configured to:
   prioritize a plurality of packets for potential transmission;
   in an iterative fashion:
   determine power requirements for control channel signalling associated with a highest priority packet not yet analyzed for resource assignment; and
   assign resources for said highest priority packet if sufficient power for control channel signalling is available and sufficient resources for said highest priority packet are available;
   the transmitter further configured to reduce said power requirements for said control channel signalling until said power requirements are less than or equal to the available power;
   wherein reducing said power requirements is used for retransmissions only.

7. The transmitter of claim 6 wherein assigning resources is further dependent on sufficient power for transmitting said packet being available.

8. The transmitter of claim 6 further configured to distribute to one or more of said plurality of packets excess power remaining after resource assignments.

9. The transmitter of claim 6 further configured to reduce prior to transmission power assignments for one or more of said plurality of packets.

10. The transmitter of claim 6, wherein the transmitter is a handset.

11. A non-transitory computer-readable medium having stored thereon computer executable instructions, that when executed by a computer, cause the computer to implement a method comprising:
- prioritizing a plurality of packets for potential transmission;
- in an iterative fashion:
- determining power requirements for control channel signalling associated with a highest priority packet not yet analyzed for resource assignment; and
- assigning resources for said highest priority packet if sufficient power for control channel signalling is available and sufficient resources for said highest priority packet are available
- wherein said determining power requirements comprises reducing said power requirements for said control channel signalling until said power requirements are less than or equal to the available power;
- wherein reducing said power requirements is performed only for retransmissions.

12. The non-transitory computer-readable medium of claim 11 wherein the computer is a handset.

* * * * *